(12) United States Patent
Wang et al.

(10) Patent No.: US 8,334,675 B2
(45) Date of Patent: Dec. 18, 2012

(54) METHOD OF CHARGING BATTERY BASED ON CALCUALTION OF AN ION CONCENTRATION OF A SOLID ACTIVE MATERIAL AND BATTERY CHARGING CONTROL SYSTEM

(75) Inventors: Chao-Yang Wang, State College, PA (US); Ou Jung Kwon, State College, PA (US); Yosuke Ishikawa, Saitama (JP)

(73) Assignees: Honda Motor Co., Ltd., Tokyo (JP); EC Power LLC, State College, PA (US)

( * ) Notice: Subject to any disclaimer, the term of this patent is extended or adjusted under 35 U.S.C. 154(b) by 150 days.

(21) Appl. No.: 12/845,195

(22) Filed: Jul. 28, 2010

(65) Prior Publication Data

US 2012/0025773 A1 Feb. 2, 2012

(51) Int. Cl.
*H02J 7/00* (2006.01)
*H02J 7/04* (2006.01)

(52) U.S. Cl. ........................................ 320/129; 320/139

(58) Field of Classification Search .................. 324/430, 324/426, 434; 320/129, 139, 141, 150, 152
See application file for complete search history.

(56) References Cited

U.S. PATENT DOCUMENTS

2010/0085015 A1* 4/2010 Hamaguchi et al. .......... 320/134

FOREIGN PATENT DOCUMENTS

JP 2002-125326 A 4/2002

* cited by examiner

*Primary Examiner* — Richard V Muralidar
(74) *Attorney, Agent, or Firm* — Arent Fox LLP (57) ABSTRACT

A controller in a charging control system controls a charger to heat a battery at a low temperature by pulse charging and discharging up to a desired temperature and then moves to a normal charging mode. The controller calculates an ion concentration of an active material at electrode portions of the battery on the basis of the temperature data and the electric current data obtained, switch the pulse charging and discharging between a charging mode and a discharging mode on the basis of a pulse width when the ion concentration reaches a threshold.

6 Claims, 6 Drawing Sheets

METHOD OF CHARGING BATTERY BASED ON CALCUALTION OF AN ION CONCENTRATION OF A SOLID ACTIVE MATERIAL AND BATTERY CHARGING CONTROL SYSTEM

BACKGROUND OF THE INVENTION

1. Field of the Invention

The present invention relates to a method of charging a battery and a battery charging control system, and particularly to a method of charging a battery such as a lithium ion battery at a low temperature for fast charging and a battery charging control system for fast charging.

2. Description of the Related Art

Vehicles such as hybrid electric vehicles (HEV) and electric vehicles (EV) travel by driving a motor using electric power from a battery. When a remaining charge in the battery decreases by discharging during, for example, traveling and a long period parking, the battery should be charged. Because quick charging may result in deterioration and shortened life time of the battery, it is recommended to charge the battery with a charging current corresponding to one-tenth of a rated capacity (0.1 C) for about ten hours from the viewpoint of protection of the battery. Since the battery at a low temperature has a high impedance, charging time can be shortened by heating the battery with a heater or the like before start of charging. Such a charging method using external heating is undesirable in consideration of layout in the vehicle because an external heating device should be mounted on the vehicle and an additional power source for a heater becomes necessary.

JP 2002-125326 A discloses a technology of controlling charging a battery in which pulse charging and discharging is performed to heat the battery and then the charging mode is shifted to a normal charging mode. According to the technology, when a battery temperature is a considerably low, (for example, at or below 0° C.), a first pulse charging and discharging with the same charge quantities is performed to heat the battery. When the battery temperature becomes slightly higher (for example, at 0° C. to 10° C.), both heating and charging are done substantially simultaneously by a second pulse charging and discharging, wherein the discharging quantity is smaller than the charging quantity. After the battery temperature reaches a predetermined temperature, the charging mode is shifted to the normal charging mode.

In the method of charging the battery disclosed by JP 2002-125326 A in which the pulse charging and discharging is repeated before the normal charging mode to increase the temperature of the battery at the low temperature, it is necessary to previously determine a pulse width and charging and discharging current quantity for the pulse charging and discharging to prevent the charging voltage from reaching an upper voltage of the battery through a pretest. The upper voltage of the battery, for example, in a case of a lithium base battery, corresponds to a highest voltage allowing no decomposition of a battery electrolyte. Actually, electrodes of the battery may be damaged before the battery voltage reaches the upper limit by causes such as deposition of lithium (Li) on a negative electrode of the lithium base battery. Therefore, the pulse width for the pulse charging and discharging should be determined through a pretest to perform the charging and discharging at a voltage slightly lower than the upper limit voltage. This operation results in poor usability for charging the battery.

The present invention provides a method of charging a battery and a battery charging control system capable of charging after appropriately heating the battery by a charging and discharging control with a threshold in pulse duration relating to avoidance of electrode damage.

SUMMARY OF THE INVENTION

A first aspect of the present invention provides a method of charging a battery, comprising the step of:
heating the battery at a low temperature by repeating pulse charging and discharging; the method further comprising:
a first step of obtaining temperature data and electric current data of the battery during the pulse charging and discharging;
a second step of calculating an ion concentration of an active material at an electrode portion of the battery as an estimation value on the basis of the temperature data and the electric current data obtained in the first step; and
a third step of switching the pulse charging and discharging between a charging mode and a discharging mode when the estimation value of the ion concentration reaches a threshold.

According to the method of charging, the ion concentration level of the active material at the negative electrode of the battery provides a trigger for switching the mode of pulse charging and discharging. This provides switching the pulse charging and discharging between the charging mode and the discharging mode before the ion concentration, which may be a factor of electrode deterioration, exceeds the threshold. Therefore, the controller can move to a normal charging mode after appropriately heating the battery up to a desired temperature without deterioration of the battery.

A second aspect of the present invention provides the method based on the first aspect, wherein the second step comprising a step of calculating the ion concentration of the active material which is near a surface of active materials in the electrode.

According to the method, the ion concentration near the electrode particle surface may be used as a trigger for switching the pulse charging and discharging between the charging mode and the discharging mode. In other words, in the pulse charging and discharging, because the surface of the electrode reaches a maximum ion concentration prior to the inside of the electrode, the pulse charging and discharging can be switched between the charging mode and the discharging mode just before a start of deterioration of the electrode. This may provide suitable heating of the battery by the pulse charging and discharging without deterioration of the battery.

A third aspect of the present invention provides the method based on the first aspect, wherein the step of calculating the ion concentration of the active material as the estimation value comprising calculating the ion concentration by a difference equation including the ion concentration of the active material at the electrode portion, a diffusion coefficient, and a value of a current flowing through the electrode portion.

According to the method, because the estimation value of the ion concentration can be obtained by a difference equation including the ion concentration of the active material at the electrode portion, the ion concentration can be estimated by a simple calculation. The ion concentration of the active material at the surface of the electrode can be estimated with the difference equation. Thus, the estimation value of the ion concentration for avoiding deterioration of the battery can be obtained.

A fourth aspect of the present invention provides a charging control system for a battery, comprising
a temperature sensor configured to detect temperature data of the battery;

a current sensor configured to detect electric current data of the battery;

a controller configured to heat the battery at a low temperature by repeating a pulse charging and discharging, calculate an ion concentration of an active material at an electrode portion of the battery on the basis of the temperature data and the electric current data obtained during the pulse charging and discharging, control a pulse widths of charging and discharging when an estimation value of the ion concentration reaches a predetermined value, and switch the pulse charging and discharging between a charging mode and a discharging mode on the basis of the pulse width when the ion concentration reaches a threshold.

According to this configuration, the controller can control a charger using the ion concentration level of the active material at the electrode portion of the battery as a trigger for switching the pulse charging and discharging between the charging mode and the discharging mode. According to this configuration, the charger can switch the pulse charging and discharging between the charging mode and the discharging mode before the ion concentration, which may be a factor regarding deterioration of the battery, exceeds a predetermined value (threshold). Therefore, the charging can be shifted to the normal charging mode after the battery has been heated to a desired temperature without deterioration of the battery.

A fifth aspect of the present invention provides the charging control system based on the fourth aspect, wherein the controller calculates the ion concentration of the active material near a surface of the electrode portion of the battery as an estimation value.

According to this configuration, the ion concentration level of the active material at the electrode portion of the battery is used as a trigger for switching the pulse charging and discharging between the charging mode and the discharging mode. More specifically, in the pulse charging and discharging, because the surface of the electrode reaches the maximum ion concentration prior to the inside of the electrode, the pulse charging and discharging can be switched between the charging mode and the discharging mode just before a start of deterioration of the battery. This provides appropriate heating of the battery by the pulse charging and discharging without deterioration of the battery.

A sixth aspect of the present invention provides the charging control system based on the fourth aspect, wherein the controller calculates the estimation value of the ion concentration of the active material by a difference equation including the ion concentration of the active material at the electrode portion, a diffusion coefficient, and a value of a current flowing through the electrode portion of the battery.

According to the method, because the controller 3 obtains the estimation value of the ion concentration by the difference equation including the ion concentration of the active material at the electrode portion, the controller 3 can estimate the ion concentration by a simple calculation. Because the controller 3 can estimate the ion concentration of the active material at the surface of the electrode with the difference equation, the controller 3 can obtain the estimation value of the ion concentration with avoiding deterioration of the battery can be obtained.

According to the present invention, when the battery at a low temperature is heated by the pulse charging and discharging, a mode is switched between charging and discharging before an ion concentration, being a factor regarding deterioration of the battery, exceeds a threshold. Therefore, the charging mode can be moved to the normal charging mode after heating to a desired temperature of the battery without deterioration of the battery.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

In a method of charging a battery according to the present invention, while pulse charging and discharging is repeated to increase a low battery temperature, pulse widths of the pulse charging and discharging are determined from an estimation value of an ion concentration of the battery. Hereinbelow, with reference to drawing will be described an embodiment preferable to the control method of charging the battery.

The same or corresponding elements or parts are designated with like references throughout the drawings and a duplicated description will be omitted.

Embodiment

In the method of charging the battery of an embodiment, an ion concentration at a surface of an active material of an electrode is considered as a factor relating to damage of the electrode, and thus pulse widths are determined on the basis of an ion concentration at a surface of electrodes real-timely estimated. This enables the charging and discharging control with an appropriate heating of the battery without damage to the electrodes during heating the battery by the pulse charging and discharging. Hereinbelow will be described the method of charging the battery in a case where a lithium base battery is exemplified.

Figure 1:
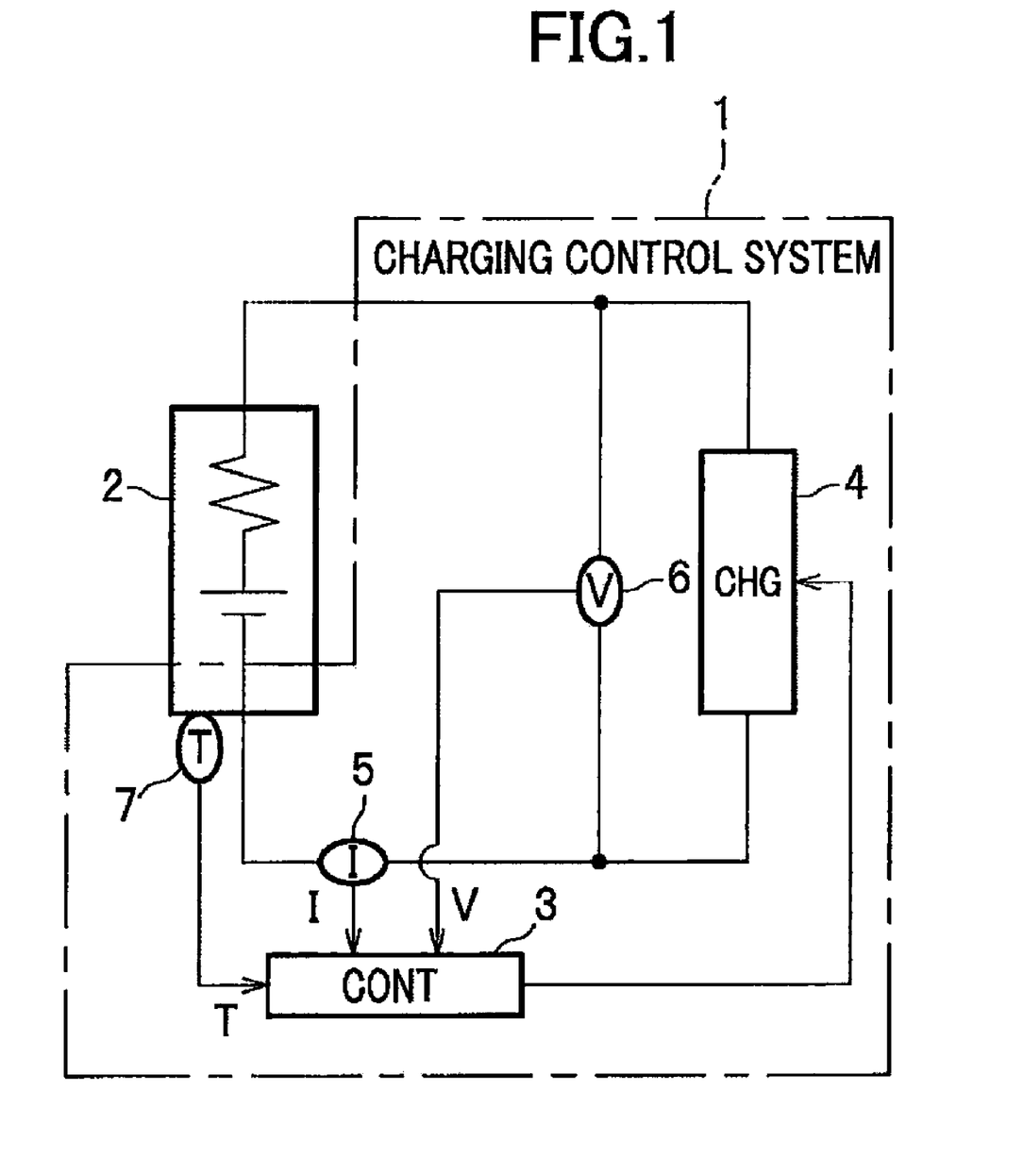
FIG. 1 is a circuit diagram of a battery charging control system configured to perform a method of charging a battery according to an embodiment of the present invention.

FIG. 1 is a circuit diagram of a battery charging control system configured to perform the method of charging a battery according to the embodiment of the present invention. The charging control system 1 shown in FIG. 1, mounted on, for example, a hybrid vehicle and an electric vehicle, is used to charge a battery 2 for supplying an electric power to a load such as a motor (not shown) and includes a controller 3, a charger 4, a current sensor 5, and a voltage sensor 6, and a temperature sensor 7.

The controller 3 receives a measured discharging current supplied to a load (not shown) such as a motor or an alternator from the battery 2, a current signal I from a current sensor 5 for detecting a charging current from the load to the battery 2, a voltage signal V from the voltage sensor 6 for detecting a voltage across terminals of the battery 2, and a battery temperature signal T from the temperature sensor 7 for detecting a temperature of the battery 2 as input data. The controller 3 controls the charger 4 on the basis of the ion concentration calculated from the input data including the battery temperature (temperature data) detected by the temperature sensor 7 and the current signal I (electric current data) detected by the current sensor 5. The controller 3 can perform the discharging and charging the battery 2 with the charger 4.

Figure 2A:
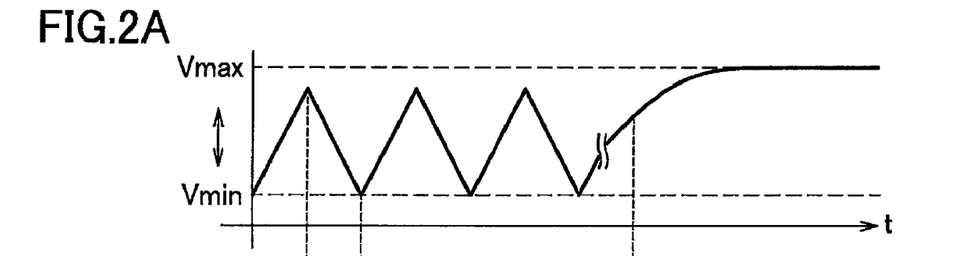
FIGS. 2A to 2D are time charts showing waveforms and variation at respect points of the battery charging control system in a pulse charging and discharging performed at a low battery temperature.
Figure 2B:
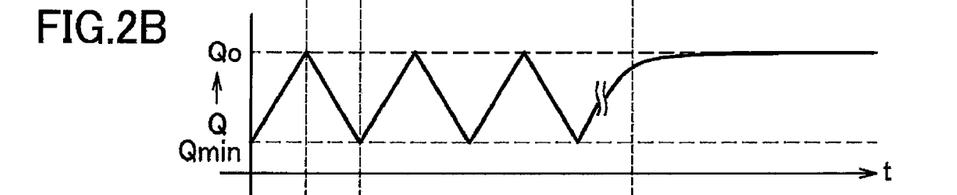
Figure 2C:
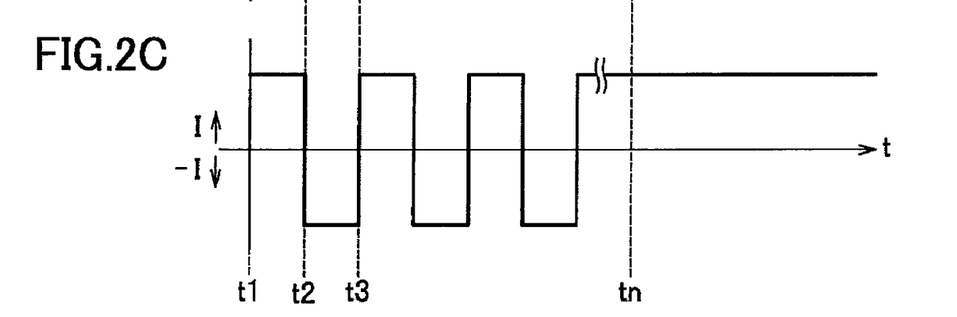
Figure 2D:
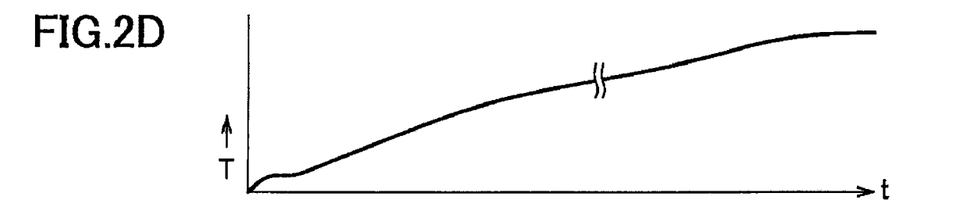

FIGS. 2A to 2D are time charts showing waveforms at respective points of the battery charging control system in a pulse charging and discharging performed at a low battery temperature in which an abscissa represents time and an ordinate represents values of the waveforms. FIG. 2A shows a waveform of the voltage signal V from the voltage sensor 6, FIG. 2B shows a variation of the ion concentration calculated on the basis of the current of the battery 2 and the battery temperature, FIG. 2C shows a waveform of the current signal I from the current sensor 5, and FIG. 2D shows an waveform of the battery temperature signal T from the temperature sensor 7.

As shown in FIG. 2A, when the pulse charging and discharging is repeated while the voltage across the battery 2 is kept under the upper voltage Vmax of the battery 2, the ion concentration deposition on a surface of the battery 2 also repeatedly varies under the ion concentration threshold 1. More specifically, when the pulse charging and discharging is performed for the battery 2, from timing t1 to t2, the battery voltage V, i.e., the voltage signal V detected by the voltage sensor 6, increases up to a voltage slightly lower that the upper voltage Vmax of the battery 2. Then, the ion concentration Q at a surface of an active material of the battery 2 increases up to an ion concentration threshold Q0. During this (from t1 to t2), the charging current I, i.e., the charging current detected by the current sensor 5, is a pulse charging current having a constant current value.

Next, when the ion concentration Q reaches an ion concentration threshold Q0 at timing t2, the controller 3 switches the mode of the charger 4 from the charging mode to the discharging mode. Accordingly, as the battery voltage V decreases to a predetermined discharge voltage Vmin from timing t2 to t3, the ion concentration Q on the surface of the active material of the battery 2 decreases to a minimum ion concentration Qmin. During this (from timing t2 to t3), the discharging current I is a pulse discharging current having a constant current value.

Repeating the charging and discharging cycle at the low battery temperature gradually increases the temperature T of the battery 2. Accordingly, the battery temperature signal T detected by the temperature sensor 7 gradually increases as shown by the FIG. 2D. After timing to when the temperature T of the battery 2 increases up to a predetermined temperature, the mode shifts to a normal charging mode.

The pulse charging and discharging control at the low temperature switches the charging pulse and the discharging pulse between the charging and discharging modes in accordance with the ion concentration between an estimation value of the predetermined ion concentration threshold Q0 and the estimation value of the minimum ion concentration Qmin. Therefore, the pulse widths of the charging and discharging pulses are determined for each cycles by the estimation value of the ion concentration threshold Q0 and the estimation value of the minimum ion concentration Qmin. The ion concentration threshold value (predetermined value) Q0 is previously determined to be such an optimal value to efficiently heat the battery 2 without damage to the electrodes of the battery 2. Further, the optimal value of the ion threshold Q0 can be previously determined by experiments or the like.

Figure 3:
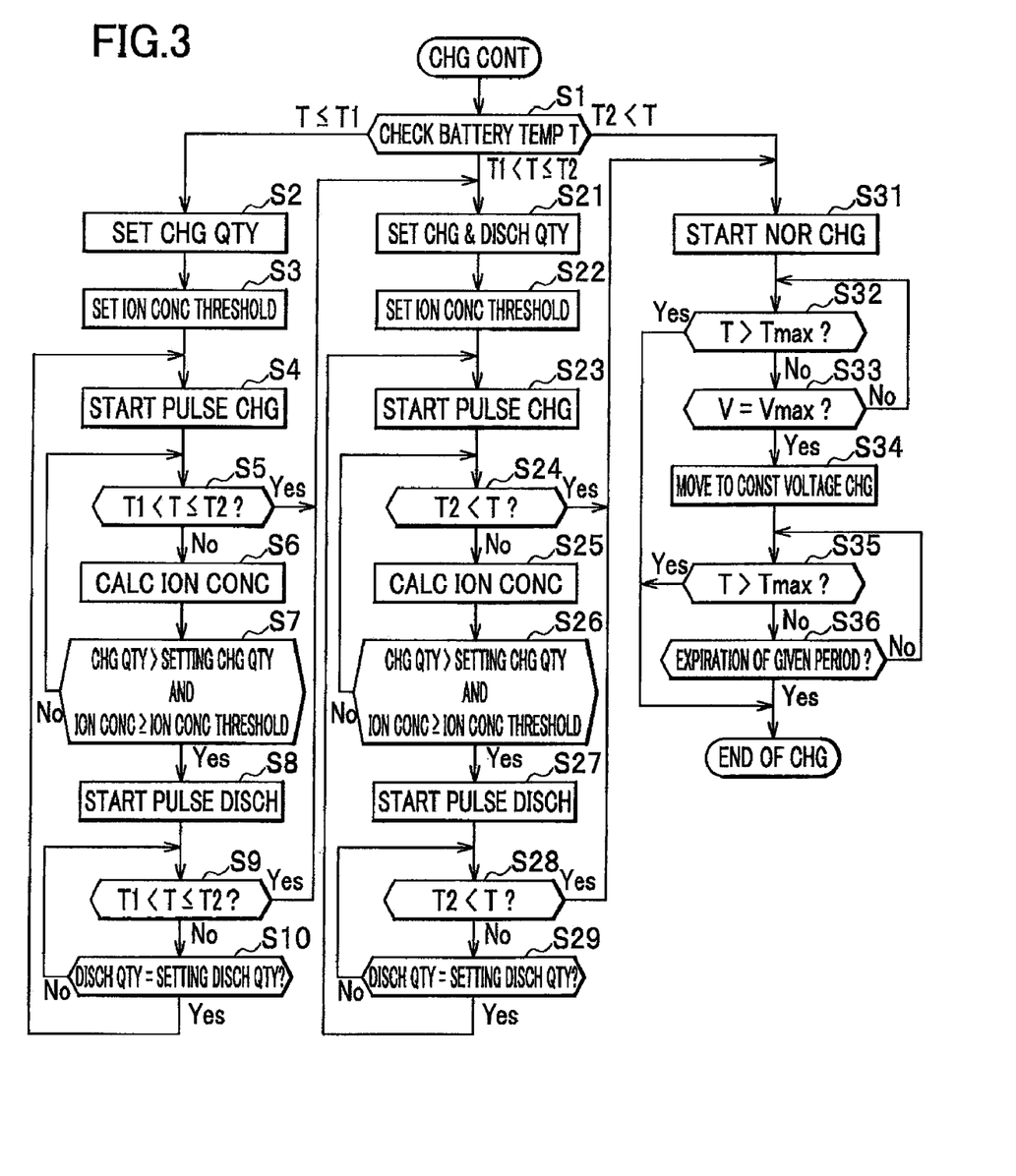
FIG. 3 is a flowchart showing a process flow of the method of charging the battery according to the embodiment.

Next with reference to a flowchart will be described a method of charging battery according to the embodiment. FIG. 3 is a flowchart showing an operation flow of the method of charging the battery according to the embodiment of the present invention. The flowchart in FIG. 3 shows a charging and discharging control by the controller 3.

In FIG. 3, first, the controller 3 performs a temperature region determination regarding the battery temperature T detected by the temperature sensor 7 (step S1). When the battery temperature T is lower than a first predetermined temperature, i.e., $T \leq T1$, i.e., when the battery temperature T is in a region where the battery temperature T is equal to or lower than a charging suitable temperature and on a lower temperature side, processing proceeds to a step S2, where a first pulse charging and discharging is performed. When $T1 < T \leq T2$ (a second predetermined temperature), i.e., when the battery temperature T is in a region where the battery temperature T is equal to or lower than the charging suitable temperature and on a high temperature side, processing proceeds to a step S21 where a second pulse charging and discharging is performed. When $T2 < T$, i.e., the battery temperature T is higher than the charging suitable temperature, processing proceeds to a step S31 to perform the normal charging.

Figure 4:
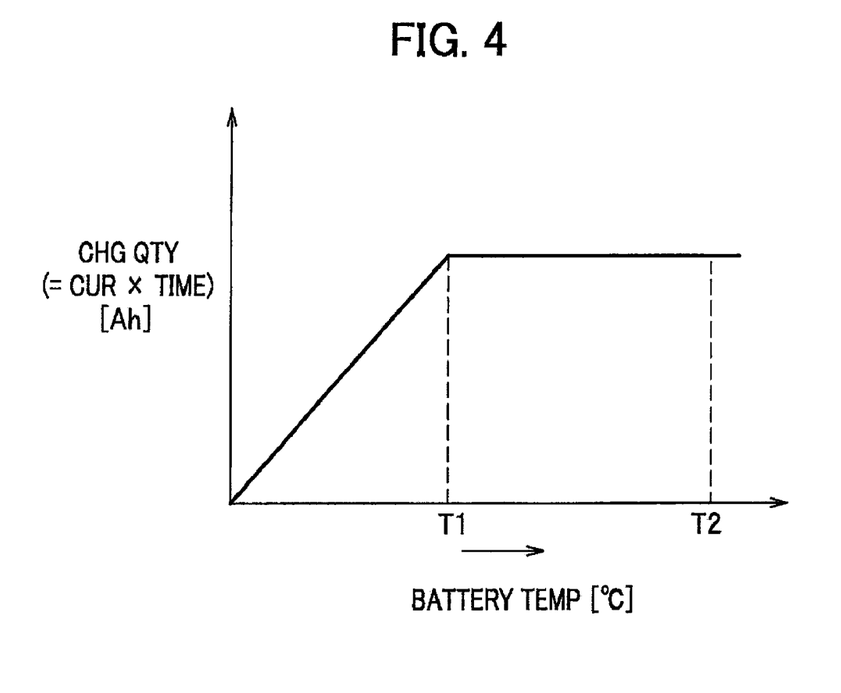
FIG. 4 is a chart showing a map representing a relation between the battery temperature and a pulse charging quantity for determining the pulse charging quantity to be set in accordance with the battery temperature.

When the battery temperature T is equal to or lower than T1, i.e., $T \leq T1$, the controller 3 sets a pulse charging quantity [Ah] in accordance with the battery temperature T with reference to a battery temperature-pulse charging quantity map previously stored in the controller 3. In this operation, the controller 3 also sets a pulse discharging quantity (step S2). FIG. 4 shows a battery-pulse charging quantity map showing a pulse charging quantity set in accordance with the battery temperature where an abscissa represents the battery temperature [° C.] and an ordinate represents the charging quantity [Ah]. In other words, in the step S2, the controller 3 sets the charging quantity for a charging period with reference to the map shown in FIG. 4 such that in the region where the battery temperature T is equal to or lower than T1, i.e., $T \leq T1$, the lower the battery temperature T the smaller the charging quantity in the charging period of the charging pulse and the discharging quantity in the discharging period of the discharging pulse become.

Next, the controller 3 sets the ion concentration threshold Q0 of the battery 2. More specifically, the controller 3 estimates a maximum ion concentration on the surface of the active material in the battery 2 which does not damage the electrodes of the battery 2 and sets this value as the ion concentration threshold Q0 (step S3).

When the setting of the charging quantity in the step S2 and the setting of the ion concentration threshold in the step S3 have been done, the controller 3 starts the pulse charging in the first predetermined temperature region (step S4). In this operation, the controller 3 sets the charging current (pulse current amplitude) I so that the battery voltage V detected by the voltage sensor 5 cannot exceed the upper limit voltage Vmax of the battery 2. The upper limit voltage means a limit voltage causing decomposition of the electrolyte in, for example, the lithium base battery, and in the process shown in the flowchart the upper limit voltage is set to 4.2 [V/cell]. Further, at the same time as the start of the pulse charging in the step S4, counting charging time (pulse width) by starting a timer (not shown) installed in the controller 3.

After start of the pulse charging in the step S4, the battery temperature T is checked as to whether $T1 < T \leq T2$ (step S5). When the battery temperature T satisfies $T1 < T \leq T2$ (Yes, in the step S5), i.e., the battery has been heated to some extent and the charging quantity is low, processing proceeds to the step S21 if a charging control with such a small charging current as to prevent the battery voltage from reaching the upper limit Vmax is possible.

On the other hand, in the determination process in the step S5, when the battery temperature T does not satisfy $T1 < T \leq T2$ (No, in the step S5), the controller 3 calculates the ion concentration Q at the surface of the electrodes of the battery on the basis of the temperature data from the temperature sensor 7 and the electric current data from the current sensors 5 (a step S6).

Next, the controller 3 checks the charging quantity which is an integration of the current I detected by the current sensor 5 by the charging time counted by the timer with reference to the setting of charging quantity which has been set in the step S2 to determine whether (charging quantity)>(setting charging quantity). In addition, the controller 3 checks the current ion concentration Q calculated in the step S6 with reference to the ion concentration threshold Q0 set in the step S3 to determine whether (ion concentration)≧(ion concentration threshold) in a step S7.

When at least one of (charging quantity)>(setting charging quantity) and (ion concentration)≧(ion concentration threshold) is true, i.e., when the first pulse charging has completed (Yes, in a step S7), the controller 3 starts the pulse discharging in a step S8. More specifically, because start timing of the pulse discharging depends on timing when the current ion concentration Q reaches the ion concentration threshold Q0, an ON period of the pulse charging relating to a pulse width depends on a period for which the current ion concentration Q reaches the ion concentration threshold Q0 (see timing t1 to t2 in FIG. 2B).

On the other hand, when neither (charging quantity)>(setting charging quantity) nor (ion concentration)≧(ion concentration threshold) is true, i.e., when the first pulse charging has not completed, or the current ion concentration Q has not reached the ion concentration threshold Q0 (No, in the step S7), processing returns to the step S5 to repeat this process.

After the pulse discharging is started in the step S8, the ion concentration Q decreases as the battery voltage V decreases. When the ion concentration Q reaches the minimum ion concentration Qmin, the controller 3 completes the pulse discharging and starts the pulse charging of the next cycle. Because the start timing of the pulse charging at the next cycle depends on the timing when the current ion concentration Q reaches the minimum ion concentration Qmin, an OFF period in the pulse discharging is determined by a period for which the current ion concentration Q reaches the minimum ion concentration Qmin (see timing t2 to t3 in FIG. 2B).

In the pulse charging and discharging at the first cycle done as mentioned above, the pulse width is determined by the ion concentration threshold Q0, the minimum ion concentration Qmin, and a slope showing variation in the current ion concentration Q, in the battery 2. More specifically, the pulse widths of the pulse charging and discharging are determined by the estimation value of the ion concentration in the battery 2.

Returning to the flowchart in FIG. 3, after start of the pulse charging in the step S4, the battery temperature T is checked as to whether $T1 < T \leq T2$ (step S9). When the battery temperature T satisfies $T1 < T \leq T2$ (YES, in the step S9), i.e., the battery 2 has been heated to some extent, processing proceeds to a step S21 if a charging control with such a small charging current as to prevent the battery voltage from reaching the upper limit Vmax is possible.

On the other hand, in the determining process in the step S9, when the battery temperature T does not satisfy $T1 < T \leq T2$ (NO, in the step S9), i.e., when the battery temperature T satisfies $T \leq 0°$ C. (NO, in the step S9), the controller 3 checks a relation between the discharging quantity which is a time integration of the discharging current I detected by the current sensor 5 by the discharging time counted by the timer (not shown) and the setting discharging quantity set in the step S2 to determine whether (discharge quantity=setting discharging quantity) is true in a step S10.

When (discharge quantity=setting discharging quantity) is true in the determination process of the step S10, i.e., when the pulse discharging at the first cycle has completed (YES in the step S10), processing returns to the step S4 to repeat the process mentioned above to perform the pulse charging and discharging at a second cycle and at the following cycle until the temperature of the battery 2 reaches 10° C. On the other hand, when (discharge quantity=setting discharging quantity) is not true in the determination process of the step S10 (no in the step S10), processing returns to the step S9 to repeat the process mentioned above.

When the battery temperature T is $T1 < T \leq T1$ (YES in the step S1, S5 or S9), the controller 3 determines the pulse charging quantity with reference to the battery-pulse charging quantity map in FIG. 4. At the same time, the controller 3 sets the pulse discharging quantity (a step S21). More specifically, as shown in the battery-pulse charging quantity map in FIG. 4, in a region where the temperature T satisfies $T1 < T \leq T2$, the pulse charging quantity is set to be constant irrespective of the battery temperature T.

In the process in the step S21, the controller 3 sets the pulse discharge quantity in addition to the pulse charging quantity. This is because when the battery temperature T is $T1 < T \leq T2$, in place of the pulse charging and discharging only for heating the battery 2 in which (charging quantity=discharge quantity), charging-rich pulse charging is performed both for heating and charging. Accordingly, the pulse discharging quantity is set to be slightly smaller than the pulse charging quantity.

Next, the controller 3 sets the ion concentration threshold Q0 for the battery 2. More specifically, the controller 3 estimates a value of the ion concentration of the active material in the electrodes of the battery, the value being such a maximum level as to prevent damage to the electrodes of the battery 2 and sets the estimation value as the ion concentration threshold Q0 in a step S22.

When the setting of the charging quantity in the step S21 and the setting of the ion concentration threshold Q0 in the step S22 have completed, the controller 3 starts the pulse charging in the second predetermined temperature region in a step S23. The charging current (pulse current amplitude) I in this operation is set so that the battery voltage V detected by the voltage sensor 5 cannot exceed the upper limit voltage Vmax. The upper limit voltage means the limit voltage not causing decomposition of the electrolyte in, for example, the lithium base battery as previously mentioned in the step S4. At the same time, the controller 3 starts counting to know the charging time period by starting the timer (not shown).

Next, the controller 3 determines whether the battery temperature T satisfies (T2<T) in a step S24. When the battery temperature T satisfies (T2<T) (YES in the step S24), i.e., when heating by the pulse charging and discharging becomes unnecessary because the battery temperature T is increased up to the charging suitable temperature, processing proceeds to a step S31 to start the normal charging.

On the other hand, when the battery temperature T does not satisfy (T2<T), i.e., when the battery temperature T satisfies T1<T≦T2 (NO in the step S24), the controller 3 calculates the ion concentration Q on the surfaces of the electrodes of the battery 2 on the basis of the temperature data from the temperature sensor 7 and the electric current data from the current sensor 5 in a step S25.

Next, the controller 3 compares the charging quantity which is a time integration of the charging current I detected from the current sensor 5 by the charging time counted by the timer (not shown) with the setting charging quantity set in the step S21 to determine whether (charging quantity>setting charging quantity) and compares the current ion concentration Q0 calculated in the step S25 with the ion concentration threshold Q0 set in the step S22 to determine whether (ion concentration≧ion concentration threshold) in a step S26.

When at least one of the determination results of (charging quantity>setting charging quantity) and (ion concentration≧ion concentration threshold) is YES, i.e., when the pulse charging by the first pulse has completed (YES in the step S26), the controller 3 starts the pulse discharging in a step S27. Because the start timing of the pulse discharging depends on the timing when the current ion concentration Q reaches the ion concentration threshold Q0, an ON period of the pulse charging depends on a period for which the current ion concentration Q reaches the ion concentration threshold Q0.

On the other hand, when the determination result in the step S26 is neither (charging quantity>setting charging quantity) nor (ion concentration≧ion concentrating threshold), i.e., when the first pulse charging has not completed or when the current ion concentration Q does not reach the ion concentration threshold Q0 (No in the step S26), processing returns to the step S24 to repeat the process mentioned above.

A process in the following steps S27 to S29 is for pulse charging of which pulse discharging quantity is smaller than the pulse charging quantity in the steps S23 to S26. More specifically, the controller 3 starts the pulse discharging in a step S27 with a discharging current of which intensity is smaller than that of the charging current. At the same time, the controller 3 saves the previous timer value indicating the charging time in a memory and resets the timer and starts counting the discharging time.

After the pulse discharging is started in the step S27, the ion concentration Q decreases as the battery voltage V decreases. When the ion concentration Q reaches the minimum ion concentration Qmin, the controller 3 terminates the pulse discharging and starts the pulse charging of the next cycle. Because the start timing of the pulse charging at the next cycle depends on the timing when the current ion concentration Q reaches the minimum ion concentration Qmin, an OFF period in the pulse discharging relating to the pulse width is determined by a period for which the current ion concentration Q reaches the minimum ion concentration Qmin.

Next, similarly to the step S24, the controller 3 determines whether the battery temperature T satisfies (T2<T) in a step S28. When the battery temperature T satisfies (T2<T) (YES in the step S28), i.e., when heating by the pulse charging and discharging becomes unnecessary because the battery temperature T is increased up to the charging suitable temperature, processing proceeds to a step S31 to start the normal charging.

On the other hand, when the battery temperature T does not satisfy (T2<T) in the determining process in the step S28, i.e., when the battery temperature T satisfies T1<T≦T2 (NO in the step S28), the controller 3 compares the charging quantity which is a time integration of the discharging current I detected from the current sensor 5 with the discharging time counted by the timer with the setting discharging quantity set in the above-mentioned step S21 to determine whether (discharging quantity=setting discharging quantity) is true in a step S29.

When (discharging quantity=setting discharging quantity) is true in the determining process in the step S29, i.e., when the pulse discharging at the first cycle has completed (YES in the step S29), processing returns to the step S23 to repeat the same process to perform the pulse charging and discharging at the second cycle and the following cycles until the battery temperature T reaches the temperature T2. On the other hand, in the determining step in the step S29, when (discharging quantity=setting discharging quantity) is not true (NO in the step S29), processing returns to the step S28 to repeat the above-mentioned process.

In the pulse charging and discharging at the first cycle, the pulse widths are determined by the ion concentration threshold Q0, the minimum ion concentration Qmin, and a slope representing variation in the current ion concentration. More specifically, the pulse widths of the pulse charging and discharging are determined by the estimation value of the ion concentration of the battery 2.

In any of cases of (T2<T) in the step S1 and YES in the steps S24 and S28, the battery heating by the pulse charging and discharging is unnecessary because the battery temperature T is in the suitable temperature region. Accordingly the controller 3 starts the normal charging mode for a constant current charging with a normal current in the step S31. Next, the controller 3 determines whether (battery temperature T>upper temperature Tmax) is true with the battery temperature T detected by the temperature sensor 8 in a step S32.

More specifically, the determining process in the step S32 is for determining whether the battery temperature T under charging is in a safe temperature region from a point view of battery protection and charging efficiency. Therefore, in the determining process in the step S32, when the (battery temperature T>the upper limit temperature Tmax) is true (YES in the step S32), i.e., when the battery temperature T exceeds the upper limit temperature Tmax, the controller 3 immediately terminates the charging.

On the other hand, in the determining process in the step S32, when (battery temperature T>upper limit temperature Tmax) is not true (No in the step S32), the controller 3 determines whether (cell voltage V=upper limit voltage Vmax) is true with the battery voltage V detected by the voltage sensor 6. For example, the controller 3 determines whether (cell voltage=4.2 [V/cell]) in a step S33.

When YES in the determination result of the step S33, i.e., when the cell voltage V reaches the upper voltage Vmax (YES in the step S33), the mode shifts to a constant voltage charging by decreasing the charging current in a step S34. At the same time, the controller 3 resets the timer value and starts the timer to count the charging time in the constant voltage charging. On the other hand, when the determining result in the step S33 is NO, i.e., when the cell voltage does not reach the upper limit Vmax (NO in the step S33), processing returns to the step S32 to repeat the above-mentioned process.

Next, similarly to the above-mentioned step S32, the controller 3 determines whether (battery temperature T>upper limit temperature Tmax (for example, 50° C.)) in a step S35. When the battery temperature T>upper limit temperature Tmax is true (YES in the step S35), i.e., the battery temperature T exceeds the upper limit temperature Tmax, the controller 3 immediately terminates the charging.

When (the battery temperature T>upper limit temperature Tmax, for example, 50° C.) is not true (NO in the step S35), the controller 3 determines with a timer value whether a predetermined time elapses from the start of the constant voltage charging in a step S36. When the predetermined time does not elapse from the start of the constant voltage charging in the step S36, processing returns to the step 35 to repeat the above mentioned process. On the other hand, in the determining process in the step S36, when the predetermined time elapses from the start of the constant voltage charging (YES in the step S36), the controller 3 terminates the charging process.

Figure 5:
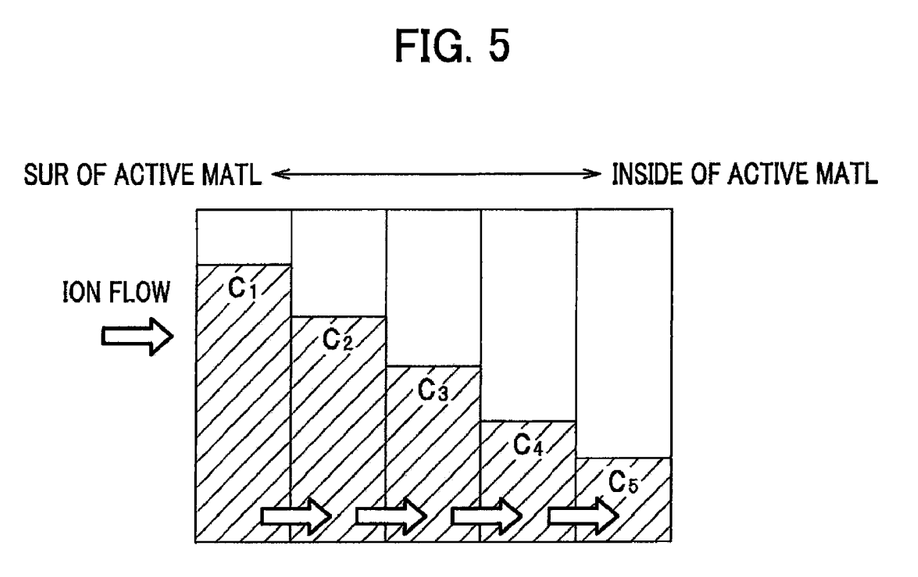
FIG. 5 shows a model of an active material in the battery for estimation calculation of an ion concentration in the method of charging the battery according to the present invention.

Next, will be described a method of estimating the ion concentration on the surface of the active material on the surface of the electrode. FIG. 5 shows a model of an active material in the battery 2 for estimation calculation of the ion concentration in the control method of charging the battery according to the present invention. As shown in FIG. 5, an analyzing model is considered in which a left side of the drawing corresponds to a surface side of the active material and a right side of drawing corresponds to an inside of the active material, the active material is virtually divided into N layers, and ions are injected from the surface side of the active material. The arrows in the drawing indicate a behavior of ion diffused into the adjacent layers of the active material in accordance with difference in the ion concentrations.

It is assumed that Ib is current (C rate), $C_i$ is a local ion concentration (i=1 to N), $D_{diff}$ is a diffusion coefficient, Cs is an ion concentration on the surface of the active material, Tc is a calculation cycle (sec), k is a calculation stage (k indicting a current cycle, (k+1) indicating the next cycle), N is the number of layers of the active material, the estimated ion concentration of the respective active material layers are given by the following EQ. (1) to (4).

A next estimation ion concentration $C_1$ (k+1) of a local ion concentration $C_1$ of the first layer is given by Eq. (1).

$$C_1(k+1)=C_1(k)-D_{diff}(C_1(k)-C_2(k))+(N \cdot Tc/3600) \times Ib(k) \quad (1)$$

A next estimation ion concentration $C_i$ (k+1) of a local ion concentration $C_1$ of the i layer is given by Eq. (2).

$$C_i(k+1)=C_i(k)+D_{diff}(C_{i-1}(k)-C_i(k))-D_{diff}(C_i(k)-C_{i+1}(k)) \quad (2)$$

where i=2 to N−1.

A next estimation ion concentration $C_N$(k+1) of a local ion concentration $C_N$ of an Nth layer is given by Eq. (3).

$$C_N(k+1)=C_N(k)+D_{diff}(C_{N-1}(k)-C_N(k)) \quad (3)$$

A relation between the local ion concentration $C_1$ of the first layer and the ion concentration $C_s$ at a surface of the active material is given by Eq. (4).

$$C_1=C_s \quad (4)$$

The local ion concentration $C_1$ thus obtained is used as the ion concentration calculated in the ion concentration calculating process or the like. An initial value of the ion concentration is determined using conversion values of a table from the battery voltage.

As mentioned above, the next estimation value of the ion concentration in the active material can be simply represented as a difference equation defined by a value of the ion concentration of the current cycle K. More specifically, the estimation value of the ion concentration can be obtained by a difference equation including the active material ion concentration $C_i$ at electrode portions of the battery 2, the diffusion coefficient $D_{diff}$ and the value of a current Ib flowing through an electrode portion. The diffusion coefficient $D_{diff}$ may be determined by a temperature table to reflect a difference in diffusion behavior depending on the temperature.

<<Experimental Result>>

Next, will be described an advantageous effect of the method of charging the battery based on the estimation value of the ion concentration according to the embodiment of the present invention with reference to an experimental result.

Figure 6:
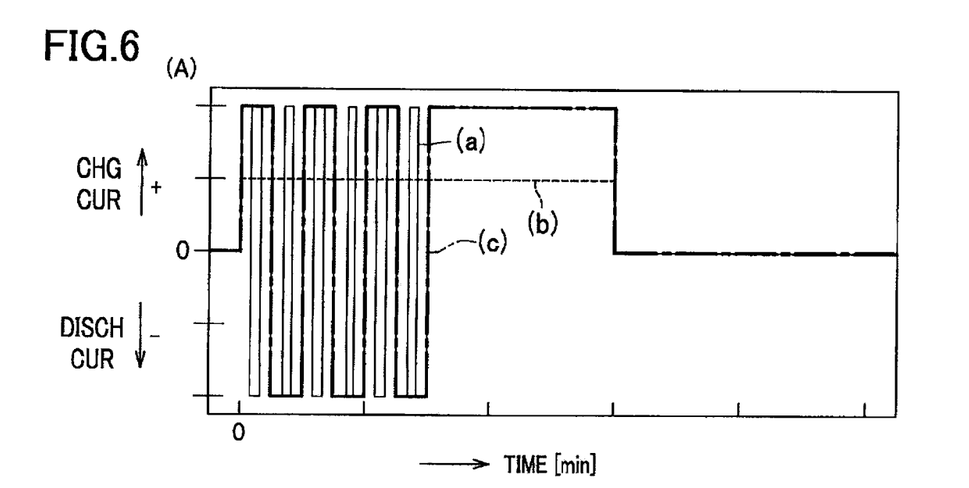
FIG. 6 is a chart showing current waveforms under charging control at a low battery temperature for comparing characteristics.
Figure 7:
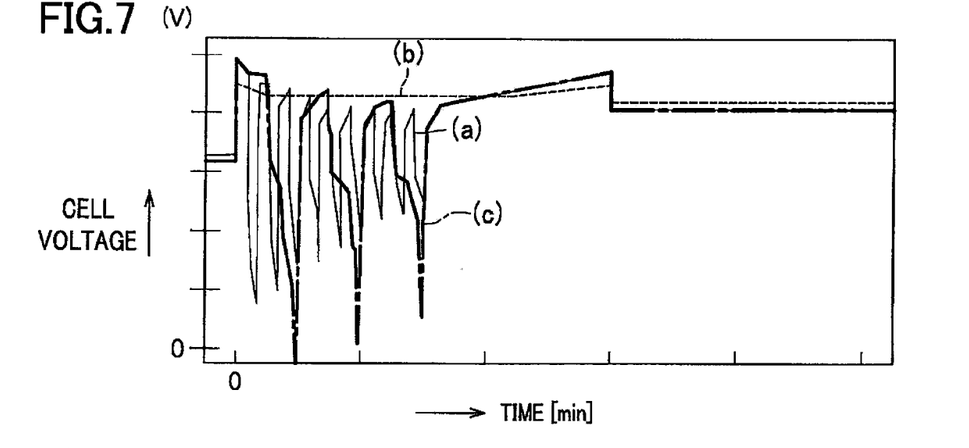
FIG. 7 is a chart showing voltage waveforms under charging control at the low battery temperature for comparing characteristics.

FIG. 6 is a chart showing current waveforms under charging control at the low battery temperature for comparing characteristics in which an abscissa represents time and an ordinate represents a current value (+ indicating the charging current, − representing the discharging current). FIG. 7 is a chart showing voltage waveforms under charging control at the low battery temperature for comparing characteristics in which an abscissa represents time and an ordinate represents the cell voltage.

Figure 8:
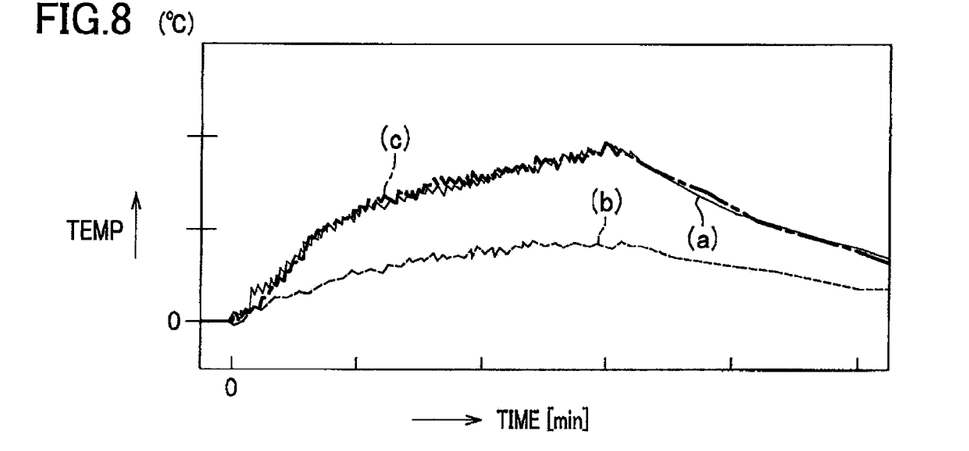
FIG. 8 is a chart showing temperature increase under charging control at the low battery temperature for comparing characteristics.

FIG. 8 is a chart showing temperature increase under charging control at the low battery temperature for comparing characteristics in which an abscissa represents time and an ordinate represents the temperature.

In FIGS. 6, 7, and 8, a pattern (a) shows a first charging control pattern for heating by the pulse charging and discharging with the pulse width control on the basis of the ion concentration on the surface of the electrodes according to the embodiment, a pattern (b) shows a second charging control pattern without heating control by the pulse charging and discharging, and a pattern (c) shows a third charging control pattern in which heating control is performed only by the pulse charging and discharging.

As shown by the current waveforms in FIG. 6, in the first charging and discharging pattern (a) according to the embodiment the pulse charging and discharging is performed at a high frequency because the pulse widths of the pulse charging and discharging are determined by the ion concentration at the low battery temperature. In the third charging control pattern (c), a frequency of the charging and discharging is slightly lower than that in the first charging control pattern (a) because the pulse charging and discharging is performed at the predetermined pulse widths. On the other hand, in the second charging control pattern (b) without the pulse charging and discharging, a constant charging current flows.

Also in the voltage waveform in FIG. 7, the first charging controlling pattern (a) according to the embodiment of the present invention shows variation in the cell voltage at a high frequency at the low temperature. The third charging controlling pattern (c) shows variation in the cell voltage at a slightly lower frequency than the first charging controlling pattern (a). The second charging control pattern (b) without the pulse charging and discharging shows a constant cell voltage maintained.

Accordingly, as shown by the temperature characteristic of the battery heating in FIG. 8, both the first charging control pattern (a) according to the embodiment of the present invention and the third charging control pattern (c) can increase the battery temperature similarly because the pulse charging and discharging is performed at the low battery temperature.

However, the second charging control (b) without the pulse charging and discharging cannot efficiently increase the battery temperature.

As shown in FIG. 8, there is no difference in advantage between the first charging control pattern (a) according to the embodiment of the present invention in which both the temperature increase control by the pulse charging and discharging and the pulse width control on the basis of the ion concentration are performed and the third charging control pattern (c) in which only the temperature increase control by the pulse charging and discharging is performed.

Figure 9:
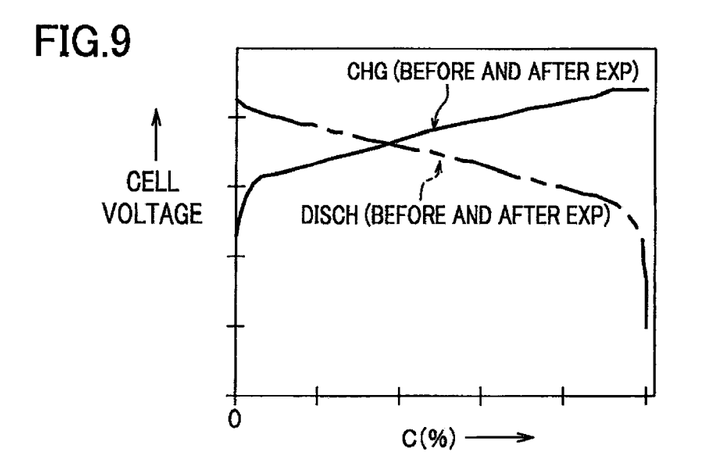
FIG. 9 is a chart showing a capacity characteristic under a first charging control pattern (a) for performing both the pulse charging and discharging control and a pulse width control according to the embodiment of the present invention.

Then, the inventors tried to compare these three patterns regarding deterioration in battery capacity before and after the charging and discharging experiment. FIG. 9 shows a capacity characteristic of the battery 2 by the first charging control pattern (a) according to the embodiment of the present invention in which the pulse charging and discharging control and the pulse width control are performed, where an abscissa represents the capacity of the battery and an ordinate represents a cell voltage.

Figure 10:
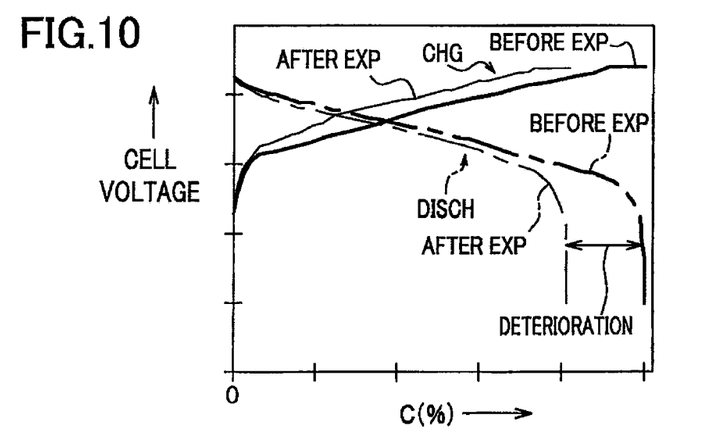
FIG. 10 is a chart showing a capacity characteristic under a second charging control pattern (b) in which the pulse charging and discharging is not performed.

FIG. 10 shows a capacity characteristic of the battery 2 by the second charging control pattern (b) in which the pulse charging and discharging control is not performed, where an abscissa represents the capacity of the battery and an ordinate represents the cell voltage.

Figure 11:
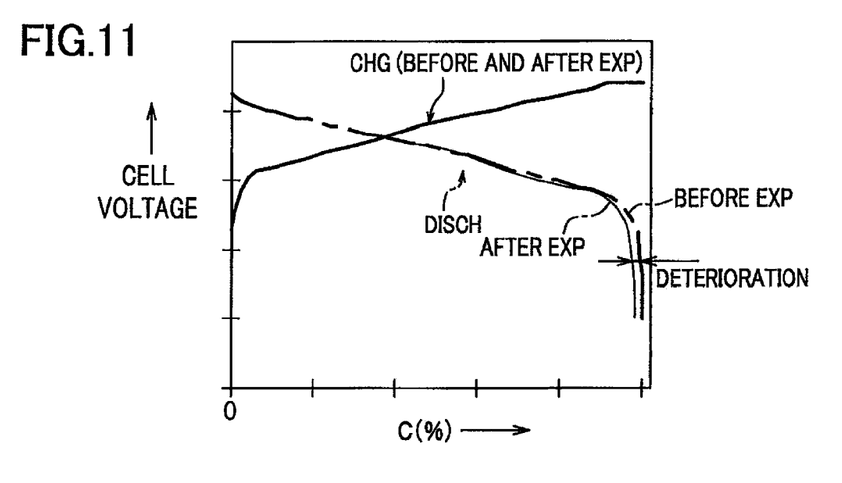
FIG. 11 is a chart showing a capacity characteristic of the battery under a third charging control pattern (c) for performing only the pulse charging and discharging control according to the embodiment of the present invention.

FIG. 11 shows a capacity characteristic of the battery 2 by the third charging control pattern (c) in which only the pulse charging and discharging control is performed, where an abscissa represents the capacity of the battery and an ordinate represents the cell voltage.

As shown in FIG. 9, the first charging control pattern (a) according to the embodiment of the present invention in which both the pulse charging and discharging control and the pulse width control are performed does not show deterioration in the battery capacity in the charging characteristic curve which is an ascending curve and the discharging characteristic curve which is a descending curve. This is caused by no occurrence of the electrode deterioration because the pulse charging and discharging is repeated at such a period that the ion concentration in the battery 2 does not exceed predetermined thresholds.

As shown in FIG. 10, the second charging control pattern (b) without the pulse charging and discharging shows much deterioration in the battery capacity on the discharge characteristic curves which are descending curves before and after the charging and discharging experiment. This is caused by that the electrodes are damaged by the ion deposition. In addition, the charging characteristic curves which are ascending curves show decrease in the charge voltage after the charging and discharging experiment as compared with the charge voltage before the charging and discharging experiment because the electrodes are damaged.

As shown in FIG. 11, the third charging control pattern (c) in which only the pulse charging and discharging control is performed show a deterioration in the battery capacity before and after the charging and discharging experiment on the discharging characteristic curve which descends in the chart. In summary, the third charging control pattern (c) shows no difference in the temperature increasing of the battery 2 from that by the pulse charging and discharging control by the first charging control pattern (a) according to the embodiment of the present invention. However, because the third charging control pattern (c) did not perform the pulse width control with the ion concentration, the third charging control pattern (c) shows deterioration in the capacity between capacities before and after the charging and discharging experiment.

The present invention is not limited to the embodiment mentioned above, but may be modified. For example, in the above-mentioned embodiment, the lithium base battery has been exemplified. However, the present invention is not limited to this, but is applicable to the pulse charging control for any battery which may show decomposition of the electrolyte by charging and discharging.

INDUSTRIAL APPLICABILITY

The method of charging a battery according to the present invention is applicable to any pulse charging and discharging system in heating the battery installed in, for example, factories, plants, and works in addition to the pulse charging and discharging system installed in a vehicle.

The invention claimed is:

1. A method of charging a battery, comprising the step of:
   heating the battery at a low temperature by repeating pulse charging and discharging; the method further comprising:
   a first step of obtaining temperature data and electric current data of the battery during the pulse charging and discharging;
   a second step of calculating an ion concentration of a solid active material at an electrode of the battery as an estimation value on the basis of the temperature data and the electric current data obtained in the first step; and
   a third step of switching the pulse charging and discharging between a charging mode and a discharging mode when the estimation value of the ion concentration of the solid active material reaches a threshold.

2. The method as claimed in claim 1, wherein the solid active material is near a surface of the electrode portion.

3. The method as claimed in claim 1, wherein the step of calculating the ion concentration of the solid active material comprises calculating the ion concentration by a difference equation including the ion concentration of the solid active material at the electrode portion, a diffusion coefficient, and a value of a current flowing through the electrode portions.

4. A charging control system for a battery, comprising
   a temperature sensor configured to detect temperature data of the battery;
   a current sensor configured to detect electric current data of the battery;
   a controller configured to heat the battery at a low temperature by repeating a pulse charging and discharging, calculate an ion concentration of a solid active material at an electrode portion of the battery on the basis of the temperature data and the electric current data obtained during the pulse charging and discharging, control a pulse width of charging and discharging when an estimation value of the ion concentration of the solid active material reaches a predetermined value, and switch the pulse charging and discharging between a charging mode and a discharging mode on the basis of the pulse width when the ion concentration of the solid active material reaches a threshold.

5. The charging control system as claimed in claim 4, wherein the controller calculates the ion concentration of the solid active material near a surface of the electrode portion of the battery as an estimation value.

6. The charging control system as claimed in claim 4, wherein the controller calculates the estimation value of the ion concentration of the solid active material by a difference equation including the ion concentration of the solid active material at the electrode portion, a diffusion coefficient, and a value of a current flowing through the electrode portion of the battery.

* * * * *